United States Patent [19]

Carmon et al.

[11] Patent Number: 4,607,144

[45] Date of Patent: Aug. 19, 1986

[54] APPARATUS FOR ENHANCING THE USE OF ELECTROMECHANICAL KEY TELEPHONE SYSTEMS

[75] Inventors: Amiram Carmon; Arie Sonesh, both of Jerusalem, Israel

[73] Assignee: Telecomputer Corporation, Ltd., Jerusalem, Israel

[21] Appl. No.: 572,514

[22] Filed: Jan. 20, 1984

[51] Int. Cl.$^4$ ............................................. H04M 1/27
[52] U.S. Cl. .............................. 179/99 H; 179/99 R; 179/18 B
[58] Field of Search ................. 179/99 R, 99 A, 99 M, 179/18 AD, 18 ES, 18 B

[56] References Cited

U.S. PATENT DOCUMENTS

| Re. 29,884 | 1/1979 | Komine et al. | 179/2 DP |
|---|---|---|---|
| 4,112,261 | 9/1978 | Shiff | 179/99 M |
| 4,260,857 | 4/1981 | Shinoi et al. | 179/99 R |
| 4,339,633 | 7/1982 | Ahmed | 179/99 M |
| 4,363,936 | 12/1982 | Christain et al. | 179/18 E |
| 4,376,875 | 3/1983 | Beirne | 179/18 B |
| 4,383,137 | 5/1983 | Aikawa et al. | 179/18 ES |

*Primary Examiner*—James L. Dwyer
*Attorney, Agent, or Firm*—Sandler & Greenblum

[57] ABSTRACT

The present invention relates to apparatus for use with a telephone system having a plurality of stations each of which becomes active when the station goes off-hook and one of a plurality of keys at the station is actuated for selecting one of a plurality of outside central office (CO) lines connected to the stations through a key service unit (KSU). The apparatus of the present invention comprises a station control unit (SCU) associated with each station for connecting the same to the KSU; and a main control unit (MCU) by which the KSU is connected to the outside CO lines. The MCU comprises a microprocessor operated central control; and a multi-state line control unit (LCU) operatively associated with each outside CO line for connecting each station in parallel to the selected CO line and/or to the central control in accordance with the state of the LCU operatively associated with the selected CO line. The present invention provides for effecting addressing between the MCU and the SCU's and for controlling the state of the LCU's as a consequence of such addressing when the MCU is operative such that the MCU manages connections of the system to the CO lines and signalling between the stations according to a predetermined plan contained in the control unit. With the arrangement described above, the MCU intercepts and controls internal dialing from the stations of the system selectively controlling, for example, access of the stations, or individuals using the system, to the CO lines.

48 Claims, 8 Drawing Figures

APPARATUS FOR ENHANCING THE USE OF ELECTROMECHANICAL KEY TELEPHONE SYSTEMS

TECHNICAL FIELD

This invention relates to apparatus for enhancing the use of electromechanical key telephone systems.

BACKGROUND OF THE INVENTION

Several methods exist for accessing a plurality of telephone trunk lines, termed central office (CO) lines, within or by a single telephone set (station). The oldest and most commonly used method is an electromechanical key telephone in which several CO lines are brought into a single station, connection between the CO lines and the telephone apparatus being made mechanically through a switch. In a typical key telephone, several CO lines are brought in parallel into a single telephone station, and the station is equipped with keys and switches in order to connect each of the CO lines, one line at a time, with a single telephone apparatus.

Because several stations typically must have access to the same CO lines, a key telephone system includes a distribution box, termed a key service unit (KSU), which distribute the tip and ring wires from each CO line, in parallel, into the several telephone stations. When several stations share several CO lines in this manner, visual indicators in the keys (or adjacent to them) are commonly used for signaling purposes to identify, for example, which CO line is ringing, which CO line is engaged, or which line is on hold. Furthermore, additional circuits, such as intercom paths, can be provided in parallel to the CO telephone lines, utilizing parts of the same equipment for local communication, but involving separate keys for intercom signaling purposes.

From the above description it is clear that every CO line which is distributed from the KSU, is physically connected to the terminal station telephone by its own tip and ring wires. The wiring cable in an electromechanical key system, which interfaces each telephone station with the KSU, must include at least one pair of wires for each CO line. Additional wires are used to transmit the visual signals, and to control the hold circuits shared by all the telephone stations. Because it is desirable to have an indication (to all users) as to which CO line is engaged at a particular moment, a particular set of wires is used to send such signals from the mechanical keys into the circuits of the KSU. It is necessary therefore, to use multiwire cables to interface the telephone sets with the KSU; and the key telephone cable and the KSU cable are commonly connected by multipin plugs and jacks.

While electromechanical key systems are simple wire distribution networks which permit manual CO line selection, they have inherent limitations that arise because, in such systems, the CO lines are not only physically separated, but their connections to all stations in which they terminate are equipotential. For example, a call coming from the outside will reach all stations connected to the CO line on which the call comes in, and can be picked up by any or all such stations. Such outside calls cannot be directed, selectively, into a specific station if the CO line is distributed to other stations as well. Furthermore, since the tip and ring pair of each CO line is totally separated from other pairs, signaling and intercom between stations is possible only through specialized additional circuits and wires. The physical separation of the CO lines in both the KSU and the telephone sets does not permit the utilization of conventional telephonic accessory equipment and devices (e.g., answering machines) on more than one CO line per device, thus making such additions quite expensive.

The simplicity is manifested also by the inability of the currently available key telephone sets to provide special features, even such conventional features that exist in single-set household telephones (e.g., abbreviated dialing and redialing); and if it desired to add to such functions, the telephone sets must be modified. Thus, in order to access specific dialing routes serviced by long distance carriers, for example, users have to either manually dial complex and lengthy access numbers and codes of the carrier switch, or use dedicated lines. The lack of simultaneous central control of the several CO lines in the KSU, limits monitoring of telephonic traffic data (e.g., numbers called, time of call, etc.), and impose difficulties on attempts to restrict access to toll calls. These limitations can be overcome by restructuring the KSU or by replacing the telephone sets and wires with specialized sets; but the procedure is both expensive and complicated.

Finally the lack of central control limits the application of secretarial functions (e.g., reminders, messages, etc.) and requires human intercession in order to carry out such functions. However, for conventional dialing out, and for answering a call, the electromechanical key system is simple and easy to operate; and such system costs much less than other, more advanced systems.

An alternative telephone system, with which it is possible to overcome some or all of the above mentioned limitations, is the electronic key system in which each telephone apparatus is accessed by only one pair of tip and ring wires. Switching between the various CO lines and the telephone stations is done in a central, electrically or electronically controlled, switching matrix located in an EKSU (Electronic Key Service Unit). Typically, the telephone station contains keys which enable the user to identify to the switching matrix which CO line the user wishes to have connected to the station. Such keys are used in a similar manner to that of the former system, in that one key is used for each CO line. Signaling and visual status indicators are made available by additional one or two pair of wires, which carry the necessary electronic signals to perform the CO line selection and control, and to turn on and off the visual indicators.

The availability of a centralized switching matrix permits a higher level of functions than can be achieved in electromechanical key telephone systems. In the more advanced electronic key systems, a microprocessor controls the switching matrix and enables central computerized signaling between different stations, indication of CO line status, transfer of calls from one station to another, and sharing of modern features such as speed dialing and redialing between several telephone stations.

While the one-to-one relation between CO lines and stations (in which particular CO lines are accessed by selected keys in the telephone station) is common to both electronic and electromechanical systems, another switching system, which employs a dynamic mode of connection, is the PBX. In a PBX, which is a miniaturization of a central telephone office, a group of telephone stations is accessed by a group of CO lines. Each station can be connected to each of the CO lines, not by a user selection, but rather by a programmed access of the central switching matrix of the PBX which controls the connections between lines and stations according to their availability and without active user involvement. As a result, the user is unaware which of the lines he is using. In order to connect to a CO line, a user must dial a request code to the PBX; and one of the CO lines out of those available is then connected to his station.

In order to transfer an incoming call to a particular station, the PBX uses the same dialing principles used in a central office. Each station can be accessed by dialing its directory number to the PBX not only from the outside, but also by other stations making interconnection possible. Since all CO lines are under central control, the PBX permits automatic, and easier routing of calls from particular stations served by it through particular lines (for example, low cost lines), as well as easier and more efficient methods of distributing incoming calls to different stations, and monitoring and recording data associated with incoming and outgoing calls. These functions provide a high degree of management and control of the telephonic traffic, and help to increase work efficiency and reduce telephone use expenses, by programming communication schedules and pathways.

In the case of a PBX system, the user can access a particular PBX function with telephone stations that need not be equipped with special function keys. All functions performed by the PBX can be accessed by dialing special codes from the conventional dial pad of a conventional telephone set because the central PBX unit is equipped with a decoding mechanism that translates the codes into functions. However, while electronic key systems and PBX's offer more functional advantages, their use requires more effort and their cost is higher than that of simpler systems.

The three types of telephone switching systems described above are not only distinctly different, but are also non-compatible in many cases. It is desirable, if possible, to utilize the functional advantages and cost benefits of each and combine them. It is, therefore, an object of the present invention to provide apparatus by which certain advantages typically available heretofore, mainly in PBX system, but some of which are found also in electronic key systems, can be added to existing or to new electromechanical system without any change of the various components of the key system, and at relatively low cost.

BRIEF DESCRIPTION OF THE INVENTION

The present invention relates to apparatus for use with a conventional telephone system having a plurality of stations each of which becomes active when the station goes off-hook and one of a plurality of keys at the station is actuated for selecting one of a plurality of outside central office (CO) lines connected to the stations through a key service unit (KSU). The apparatus of the present invention comprises a station control unit (SCU) associated with each station for connecting the same to the KSU; and a main control unit (MCU) for connection between the KSU and the outside CO lines. The MCU has a microprocessor-based central control; and a multistate line control unit (LCU) operatively associated with each outside CO line for connecting each station in parallel to the selected CO line and/or to the central control in accordance with the state of the LCU operatively associated with the selected CO line.

Both the MCU and the LCU's can carry out addressing operations and are, themselves, addressable. The present invention provides for effecting addressing between the MCU and the SCU's and for controlling the state of the LCU's as a consequence of such addressing when the MCU is operative such that the MCU manages connections of the system to the CO lines and signalling between the stations according to a predetermined plan contained in the control unit.

With the arrangement described above, the MCU intercepts and controls internal dialing from the stations of the system selectively controlling, for example, access of the stations, or individuals using the system, to the CO lines. This and other features of the invention requires the stations to be identified to the central control; and to this end, each SCU is responsive to an off-hook condition and to actuation of a key at a station that becomes active for generating a unique address signal that identifies the active station. The state of an LCU determines the nature or configuration of a communication link between the stations of the system and the central control.

Each LCU is normally in a first state, when the MCU is operative, such that an off-hook station is connected to the central control via the LCU associated with the selected CO line, but is disconnected from the CO line itself whereby an active station normally is denied connection to a CO line. However, the central control can selectively change the state of any of the LCU's to a second state such that any of the CO lines can be connected to the stations of the system. When an active station generates dialing information, such information is transmitted only to the central control because the LCU associated with the CO line selected by the active station is in its first state. The central control decodes the dialing information from the active station and carries out whatever function is requested. If the request is for making an outside call on the selected CO line, the central control may generate the necessary outside dialing information provided the request is from an authorized station and/or contains an authorization code if long distance dialing is being requested. The central control can then monitor the response to the outside dialing, all without any intercession by, or even knowledge of, the active station, and can provide recorded or synthesized audio information to both the active station if it is still off-hook and to the called number if an answer is obtained. In addition, the central control can ascertain whether the called number is busy, or whether the called number does not answer after a predetermined number of rings; and it can redial until an answer is achieved or a predetermined number of attempts have been made without an answer.

If a called number answers, the central control can generate the address of the station that originated the call and transmit the address thereof to the SCU with which the originating station is associated thus alerting the user at that station regardless of whether the station is on- or off-hook. In addition, the central control can change the state of the LCU associated with the CO line selected by the active station, or any other station, to its second state thereby connecting the CO line to the station that originates the call, or to some other station designated by the code dialing information generated by the station that originated the call.

If the called number does not answer, or is busy, the central control can signal the originating station and inform the user of the status of the call using a recorded audio signal or a synthesized signal. If the coded dialing information generated by an active station is a request for connecting the active station to another station of the system, the address of the other station is generated by the central control and transmitted via the LCU that is associated with the CO line selected by the active station. Each SCU has an indicator associated therewith for generating an indicator signal when the indicator is actuated, and is responsive to address signals in the communication links associated with the LCU's for actuating the indicatorassociated therewith only when the SCU is addressed by its unique address signal whereby the station is alerted to a call from another station.

The advantages gained by an electromechanical key system, according to the present invention, can be grouped into several categories:

(1) Direct access to any station by an outside caller.
(2) Management of incoming calls and their automatic distribution to called parties.
(3) Use of the tip and ring wires for intercom and interstation signaling.
(4) Acquisition and storage of telephonic and time data of incoming and outgoing calls for printing.
(5) Efficient control of dialing (using abbreviated dialing method and automatic redialing) made accessible to all standard stations.
(6) Automatic dialing of outgoing calls through the least cost long distance services.
(7) Automatic forwarding of incoming calls to other, external, telephones.
(8) Automatic initiation of calls at predetermined times.
(9) Transmission of calls in the absence of caller.
(10) Reception and recording of incoming calls on all lines by single answering machine.

The present invention achieves these and other results by fulfilling these basic requirements:

(1) Dialing from and into a key telephone set is intercepted and controlled by the MCU positioned between the KSU and the CO lines.
(2) The MCU is capable of addressing specific telephone sets in the system in order to alert the user that his telephone is being addressed.
(3) A communication from a telephone set into the MCU identifies the telephone set that issues the communication.
(4) The MCU provides the various advantageous functions listed above to the telephone station by utilizing its control of communication pathways.

Although it is possible to achieve some of these results by changing the wiring of the KSU, and the cables connected thereto, or by other structural changes in the circuits of the KSU, the present invention achieves these results by components connected to the KSU without modifying the KSU itself.

BRIEF DESCRIPTION OF THE DRAWINGS

An embodiment of the present invention is illustrated in the accompanying drawings wherein.

DETAILED DESCRIPTION

Figure 1A:
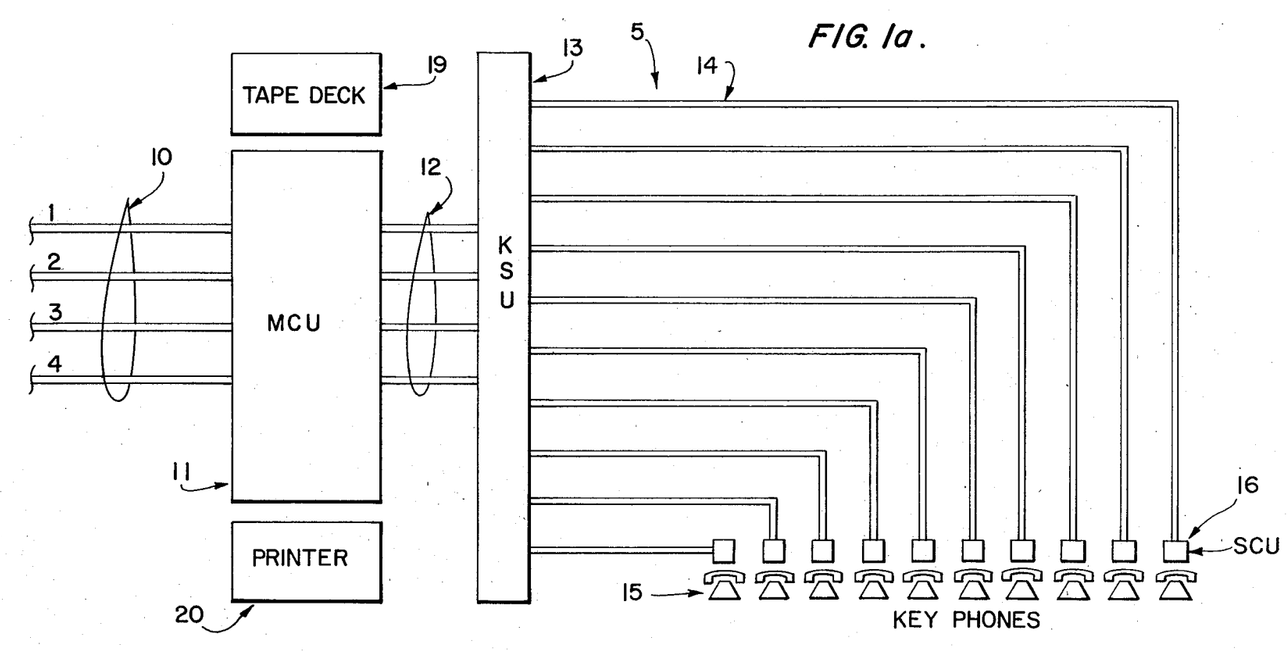
FIG. 1a is a block diagram of the main components of the present invention showing it incorporated into a conventional key telephone system connected to a plurality of central office lines via a conventional key service unit.

Referring now to FIG. 1a of the drawings, reference numeral 5 designates an electromechanical key telephone system into which the present invention is incorporated. System 5 comprises a plurality of conventional key telephone stations 15 (for example, 2564, 8564, etc.), each of which becomes active when the receiver of the station goes offhook and one of a plurality of keys 6 (see FIG. 6) at the station is actuated for selecting one of a plurality of central office (CO) lines 10 connected by key service unit (KSU) 13, which is known under the generic name 1A2, to telephones 15 through multiconductor cables 14. This much of the apparatus shown in FIG. 1a is conventional.

According to the present invention, a separate main control unit (MCU) 11 is interfaced between incoming CO lines 10 and KSU 13; and a separate station control unit (SCU) 16 is interfaced between each of the telephones and KSU 13. MCU 11, which controls a plurality of incoming CO lines 10, is connected by separating the tip and ring wires which are between the KSU and the termination of the central office lines in a customer's premises, from the other wires and bringing the ends of each into respective IN and OUT terminations in the MCU. Lines 12, emerging from MCU 11, correspond to CO lines 10, and connect the MCU to KSU 13. A single MCU is needed for the entire key system. As described in detail below, MCU 11 also containes controlling software for the apparatus of the present invention, and has associated with it, accessory components, such as tape deck 19 and printer 20, needed for comprehensive operation.

Figure 1B:
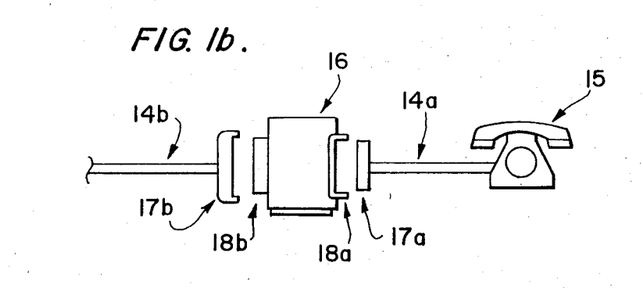
FIG. 1b is a detail of the manner in which a station control unit of the present invention is interconnected between a telephone and a conventional key service unit.

Each SCU 16 controls transmission from and to a station and MCU 11, and includes appropriate software and hardware to carry out these and other functions. As shown in FIG. 1b, SCU 16 is positioned between the 50 pin jack termination of the multiwire cable of KSU 13 and the 50 pin plug termination of the multiwire cable connecting into the telephone station. The connection is made by separating the 50 pin plug from the 50 pin jack, and inserting the plug and jack into respective 50 pin jack and plug connectors built into the SCU.

Conventional multiwire cables 14 connect electromechanical key telephones 15 to KSU 13, each cable and telephone being connected through a single SCU 16 to the KSU. Each multiwire connection to cable 14 is made up of two parts: cable 14a which comes out of keyphone 15 and terminates in standard 50 pin plug 17a, and cable 14b which comes out of KSU 13 and terminates in standard 50 pin jack 17b. Jack 17b can be separated from plug 17a, and SCU 16 can be interposed between them. SCU 16 is equipped with a standard 50 pin plug 18b into which jack 17b can be connected, and standard 50 pin jack 18a into which plug 17a can be connected.

DETAILS OF THE MCU STRUCTURE AND FUNCTION

Figure 2:
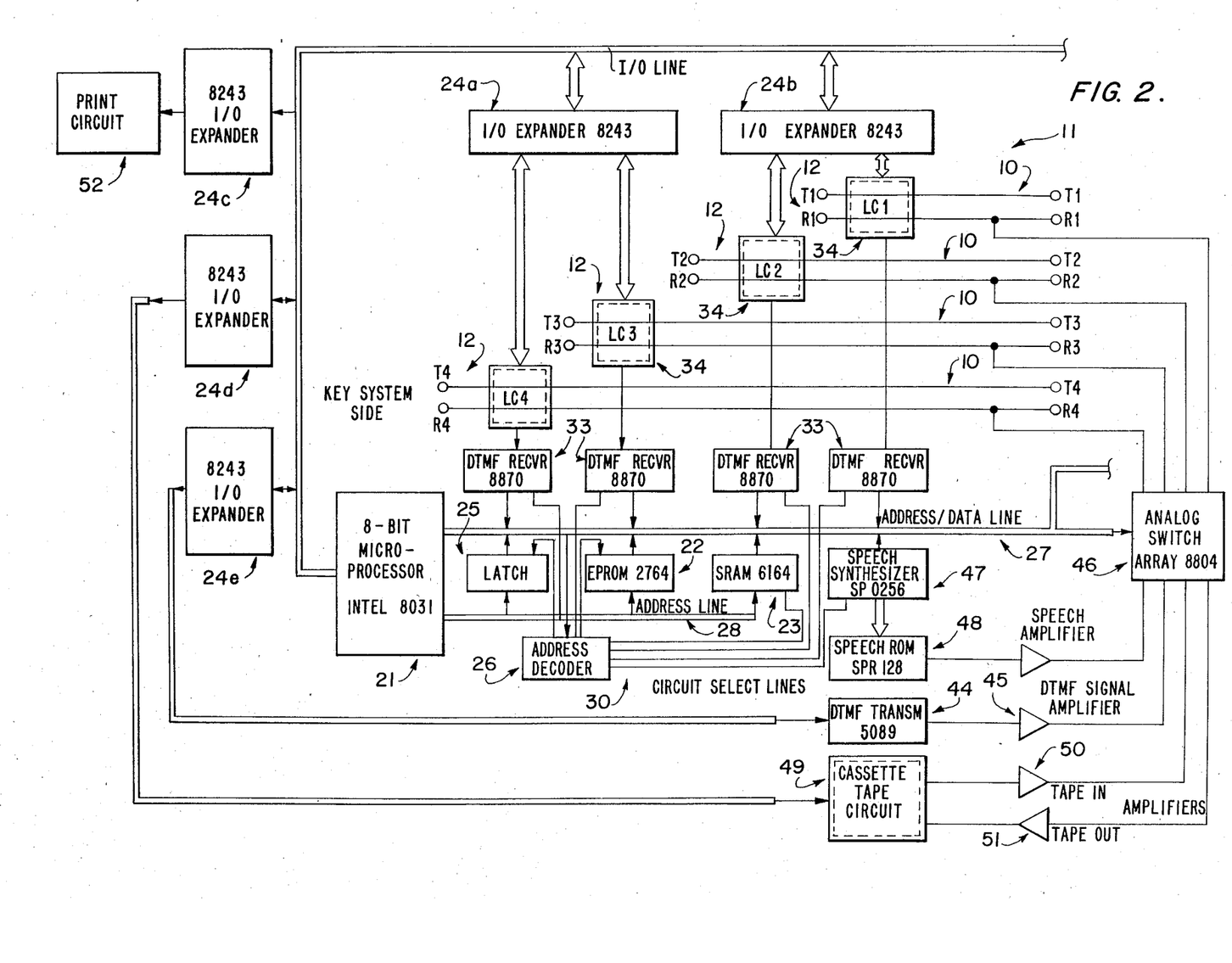
FIG. 2 is a more detailed block diagram of a main control unit according to the present invention.

Referring now to FIG. 2, MCU 11 is based on microprocessor controller 21 (such as Intel 8051), and is associated with program memory integrated circuit 22 (such as Intel 2764 EPROM) and data memory 23 (such as Hitachi 6116 low power SRAM). Several I/O expander devices 24a-e (such as Intel 8243's) provide sufficient ports for data acquisition from and control of CO lines 10. Latch 25 and address decoder 26 complete the microcomputer circuit block. Microprocessor 21 has several ports which are used to establish address/data line 27, address line 28, and input/output control line 29. The various integrated circuits are program selectable through circuit chip select lines 30.

Figure 3:
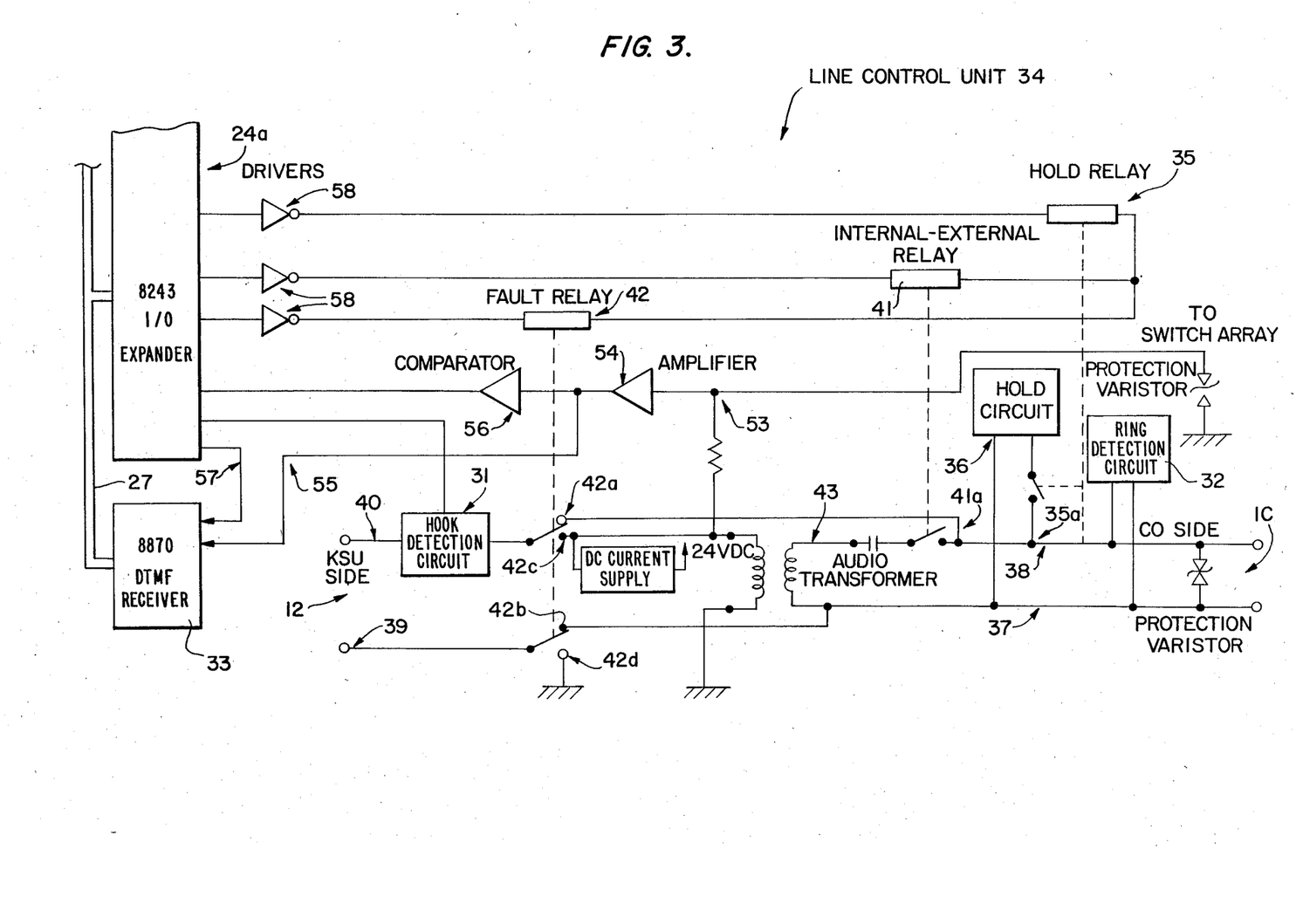
FIG. 3 is a more detailed block and circuit diagram of a line control unit according to the present invention which is shown in more general form in FIG. 2.

FIG. 2 shows how tip and ring wires (T1-T4 and R1-R4, respectively) of each of the four CO lines 10 pass into line control units (LCU's) 34, one for each CO line. Details of each LCU 34 are shown in FIG. 3 to which reference is now made.

Monitoring of the CO line with which the LCU is associated is performed by hook detect circuit 31, ring detect circuit 32, and by dual tone multiple frequency (DTMF) receiver 33 (such as Mitel 8870). Each of the two detect circuits has a distinct input into microprocessor 21 through input/output expander 24; and data from DTMF receiver 33 is inputted through address/data line 27.

Ring detect circuit 32 senses a ring signal (100 V 30 HZ typical) emanating from the central office, this signal being indicative of an incoming call. Hook detect circuit 31 monitors the "on" and "off" hook states of the telephone sets in the system. An off-hook state establishes that a closed loop exists with the central office; an on-hook state is a disconnected loop. All DTMF signals coming from either the internal telephone sets of the system, or transmitted from a CO line, are detected by DTMF receiver integrated circuit 33 associated with the line.

CO line tip wire 37 and ring wire 38 are transformer coupled to internal tip wire 39 and ring wire 40 by audio transformer 43. Each of the tip and ring wires is controlled by three relays operated by the microprocessor.

(1) Hold relay 35: Contacts 35a of this relay are normallly open. When the relay is activated, contacts 35a close causing hold circuit to establish a closed DC loop with the central office thus capturing the CO line with which the LCU is associated. When contacts 35a are closed, the hold circuit bridges the tip and ring wires of the CO line with resistance equivalent or similar to that of the telephone set (typically 120-400 OHMS). Operation of relay 35 is under the control of microprocessor 21 and enables the microprocessor to control the connection with the CO line with which the relay is associated.

(2) Internal-external relay 41: Contacts 41a of this relay are normally open. When ring detector 32 detects an outside ring on the CO line with which the LCU is associated, relay 41 can be activated by microprocessor 21 to close contacts 41a to form an audio pathway, via audio transformer 43, between the CO tip and ring wires and the internal tip and ring wires 39, 40. Relay 41 is also used to block speech transmission from internal devices which generate audio frequency signals into the external part of the CO line. The application of this isolation will be described later.

(3) Fault relay 42: This is a fail-safe relay whose function is to maintain the internal tip and ring wires disconnected from the external tip and ring wires when the MCU is operative. Normally, microprocessor 21 activates this relay closing contacts 42a and 42b in the position shown in FIG. 3. However, in case of power failure, relay 42 is deactivated closing contacts 42c and 42d thereby connecting the internal tip and ring wires to the CO tip and ring wires and permitting reception of calls and transmission of calls by the central office battery power. This relay ensures continuous operation of the telephone system even in case of power failure.

Relays 35, 41 and 42 are operated by drivers 58 which are activated by microprocessor 21 in accordance with control signals sent through I/O expanders 24a and 24b (FIG. 2). These relays, in combination with the three sensing circuits hook detect circuit 31, ring detect circuit 32, and DTMF receiver 33, which send status information to the microprocessor, permit the MCU to perform the functions listed below.

(1) Detection of DTMF request signals originating from either outside CO lines or an internal telephone station. These signals can be also coded for printing in printer circuit 52.

(2) Seizure of a CO line by activating the hold circuit associated therewith without transmission of a dial tone; connection of the CO line to the telephone station in order to record the digits dialed by the station for call authorization; and release of the line, according to a program in EPROM 22.

(3) Automated dialing of the same or different sequence of DTMF tones generated by a station into any outside line after seizing the line and recording the number dialed from a station. The MCU, through I/O expander 24e (FIG. 2), can dial a sequence of DTMF tones through DTMF transmitter 44 (such as Mostek 5089). The output of transmitter 44 is amplified at 46 and applied to analog switch array 45 which functions to route the DTMF tones to a CO line 10 selected by the MCU in accordance with a built-in program. This arrangement also permits programmed automatic dialing from any internal set to an outside number (for radialing), or dialing a DTMF code from the data memory 25 (for speed dialing). Such dialing can also be programmed to utilize special low cost routes of long distance services. Because microprocessor 21 includes a real time clock, dialing can be programmed to be initiated automatically at any preselected time.

(4) Direct outside dialing to a particular station in the system, DTMF (and other signals) coming from a station are intercepted on transmission line 53 connected to the output of audio transformer 43 (FIG. 3), and are amplified by amplifier 54 prior to being fed into DTMF receiver 33 through input line 55. Comparator 56, following amplifier 54, signals the presence of DTMF signals to microprocessor 21 through I/O expander 24a. DTMF receiver 33 is addressed for reception through activating line 57.

The above described arrangement permits transmission of an outside call into a particular station. When ring detect circuit 32 detects a ring signal coming through a CO line, this information is sent to microprocessor 21 which responds by activating hold relay 35 which is effective to seize the line. Once the line is seized, the MCU will listen through the I/O line if additional DTMF signals are being transmitted into the CO line. The dialing of such additional digits, which are intended for reaching particular stations is optional. Information about such option can be disseminated by a user so that his station can be called directly from outside the system without a chance distribution to other stations. This information is an "internal directory" of the key system; and the manner in which a targeted station is addressed will be described below in connection with the operation of the SCU. If, after a predetermined period of time, no such 'extra' digits are intercepted, the MCU will establish a connection between the CO line and all stations connected to this line.

(5) Transmission of audio signals, other than conversational communication signals, into either the called or calling side (being either the CO or the terminal set), or to both sides simultaneously. Such signals can be sent from speech synthesizer 47 (such as General Instrument SP-0256) and its speech memory ROM 48 (such as General Instrument SPR-128), or from and to cassette tape deck 19 operated by cassette circuit 49 through tape-in amplifier 50 and tape-out amplifier 51. The cassette circuit is under program control through I/O expander 24d; and the speech synthesizer, is under control of address/data line 27. The real time clock in the MCU coupled with the ability of the MCU to automatically dial out a sequence of digits stored in the data memory of the MCU, permit transmission of speech signals in the absence of the user. Such speech signals can be transmitted at preset times to external telephone numbers programmed into the memory of the MCU, or to one or all of the internal stations to permit verbal alerting messages or reminders to be disseminated internally. Switch array 46 enables programmed transmission through any CO line.

(6) Reception of a call from the outside on one CO line and transmission of the same call to a different outside telephone. This is achieved using switch array 46 which permits DTMF transmitter 44 to dial an outside telephone number on another CO line, according to a preprogrammed instruction.

(7) Inhibition of transmission to either side of the CO line or both, for purposes such as toll restriction (limited access to long distance lines), or automatic announcements to a calling party on the outside, or for intercom between two or more telephone stations on the same CO line.

The inclusion of other, non conversational audio sources, and the ability to receive and decode DTMF signals, enables the MCU to form a comprehensive communication network. DTMF transmitter 44 (which may be a key telephone), and the key pad operating it, can serve to address commands to the MCU to perform certain functions which have been programmed into its program memory. Furthermore, the digital content of each call made (such as number dialed) can be intercepted and stored in the data memory of the MCU.

Sensing DTMF signals coming from a CO line, can serve to provide instructions coming from the outside the system via a CO line, thus enabling a *remote* operation of the MCU from any telephone set equipped with a DTMF transmitter.

The DTMF transmitter, which may be a key telephone, and the DTMF receiver in the MCU enable the MCU to be addressed by any of the stations. In order to provide full duplex communication between the MCU and any station in the system, i.e., addressing of a user by the MCU, a programmable speech synthesizer in the MCU is used. The speech synthesizer is programmed for a number of phrases which are used for:

(1) prompting the user in his programming steps;
(2) verifying verbally to the user the data he programmed into the MCU memory; and
(3) calling the attention of the user to certain preprogrammed functions.

Figure 4:
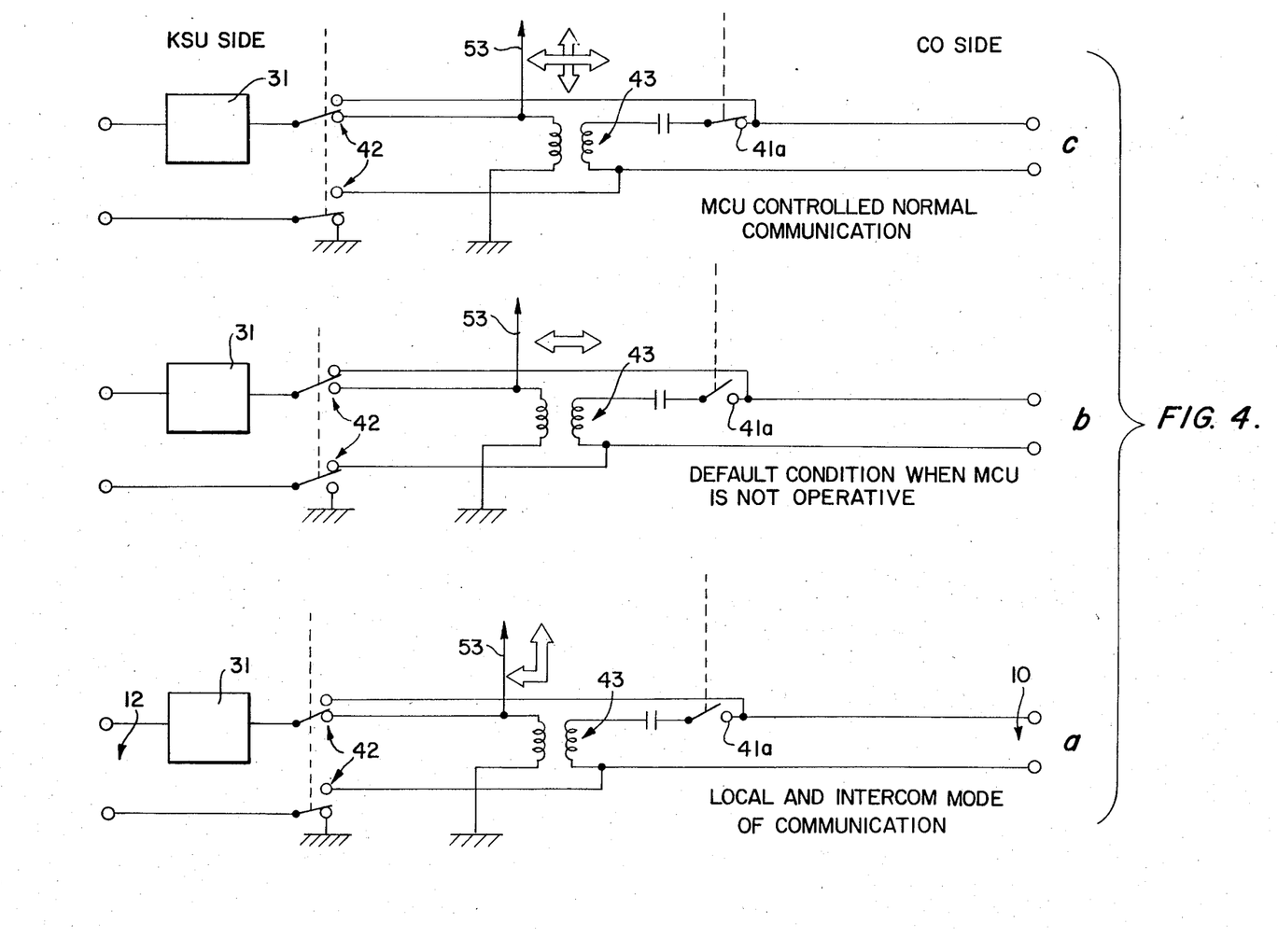
FIGS. 4a-c are circuit diagrams of a portion of the circuit shown in FIG. 3 showing three states of the line control unit that establish different configurations of the communication link between a line control unit and the stations of the telephone system.

The structure of the MCU provides for full duplex communication with a station, once the user lifts the handset and selects a line. Upon the transition of the station to an off hook state, and the connection of a particular CO line 10 to the station, the MCU provides a local communication loop. Internal-external relay 41 is open when this occurs, and fault relay 42 is activated by the MCU connecting the station to audio transformer 43 as depicted in FIG. 4a. Hook detect 31 circuit and ring detect circuit 32 are operative in this and in all other conditions.

When a local loop condition exists, audio communication of the key telephone set is limited to the MCU. In this condition the MCU can send audio signals, such as the output of cassette deck 19, and/or the output of speech synthesizer 47 to the telephone set. A user can then dial DTMF codes into the MCU without transmitting them into a CO line; and, as a consequence, the user can signal another user, through the MCU, to pick up the same line thus forming an intercom loop.

If the user dials a DTMF sequence intended for dialing on a CO line in order to call an outside number, the MCU will recognize the sequence and will close internal-external relay 41 forming a simultaneous communication link between the telephone station originating the call and one of the outside CO lines 10 as depicted in FIG. 4c. In this situation, if the telephone station is in the on-hook state, audio transmission from the speech synthesizer and cassette tape deck of the MCU will be sent into the external CO line only. Thus, verbal announcements can be sent to outside telephones automatically and independently of the telephone stations of the key system.

Another condition exists in case of power failure and is depicted in FIG. 4b. In this case, internal/external relay 41 will be unactivated and contacts 41a will remain open. However, fault relay 42 will also be unactivated; and contacts 42a and 42b will be positioned to connect the tip and ring wires 12 on the KSU side with the tip and ring wires 10 on the CO side a connection bypassing the MCU.

SCU STRUCTURE AND FUNCTIONS

The above described arrangement permits communication between the stations and the MCU only if a user has lifted the handset at his station and pressed a line-selection key. Absent this condition, the MCU cannot *call* a particular telehone set on its own. Furthermore, a user has to actively indicate (by dialing a number) from which telephone set he is calling; and if he does not do this, the MCU cannot determine which station is addressing it. The SCU is used in order to overcome these limitations, and to provide for automatic communication between the MCU and the telephone station. Thus the SCU is an addressing-addressable unit associated with each terminal set (station).

The SCU functions to automatically identify a station to the MCU so that each time a station is activated and dialing occurs, the source of the dialing will be identified, without requiring the user to actively identify the station to the MCU by manually dialing the ID of the station. The identification process carried out by the SCU is not conditioned on dialing, but only on hook-off and line selection conditions at a station. In addition, the SCU receives and decodes signals issued from the MCU in order to alert a particular station.

Figure 5:
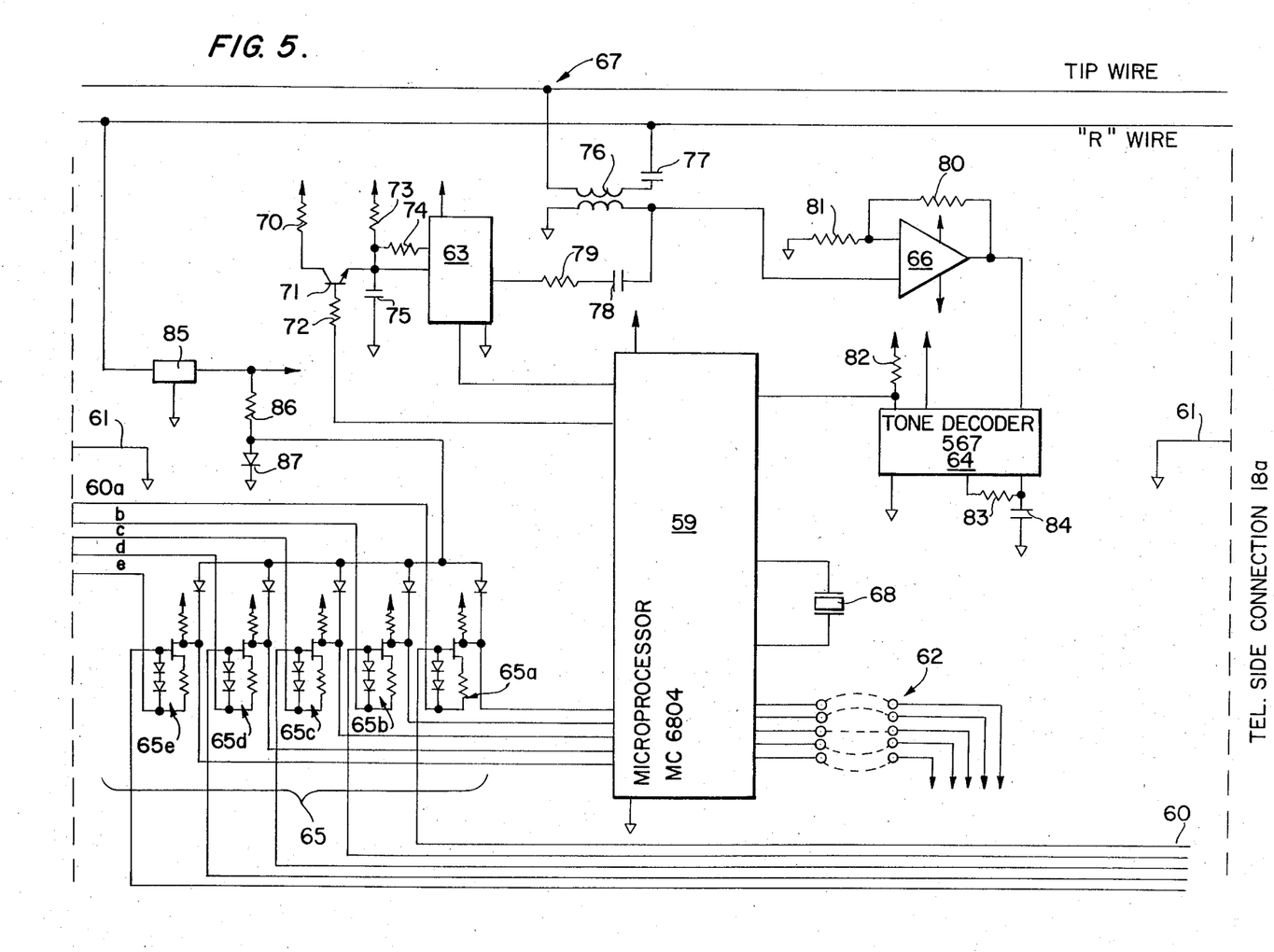
FIG. 5 is a detailed block diagram of a station control unit according to the present invention.

All of the SCU's units are connected to the control wires in each of the CO lines that pass through the KSU. High frequency, code-modulated signals (e.g., signals with a frequency greater than about 20 KHZ) are used for duplex communication between the MCU and SCU's. Thus the signals are not audible to the human ear, but are detected by special circuits associated with each SCU and the MCU as described below. FIG. 5 depicts the structure and function of an SCU which is connected to the control CO line, and shows the input of other keys each associated with one of additional CO lines.

Each SCU 16 includes microprocessor 59 (such as Motorola MC6804) with associated circuits. When a line-selection key is pressed in the key telephone set associated with the SCU, wire 60 (commonly referred to as the "A" wire), one of which is associated with each key, is connected to ground through contact with wire 61 (commonly referred to as the "AG" wire) which is another standard wire common to all keys. The connections of all such wires into the SCU circuits is achieved by contacts in plug 18b and jack 18a. The grounding signal appearing on an "A" line is inputted through pushbutton-state detection circuit 65 into microprocessor 59, thus identifying the CO line which the user has selected for connection to his telephone set.

Circuit 65 comprises a plurality of identical logic circuits 65a–e, one for each line selection key (and thus one for each CO line) in the telephone set to which the SCU is connected. Circuit 65 has three diodes, a transistor and two resistors. The logic level in this circuit is 5 volts and will change to zero whenever a short exists between wire 60 feeding into it to ground.

Current is supplied to the SCU through tip wire 88 of the control line from an additional power supply (not shown) which is located in the MCU. This additional power supply is referenced, not to the ground of the MCU power supply, but to the ground of the KSU power supply through the "AG" wire.

The state of input circuit 65 causes microprocessor 59 to trigger oscillator 63 (such as National Semiconductor 555 timer) which normally operates at a frequency determined by resistors 73, 74 and capacitor 75. During the time that switching circuit 70, 71 and 72 is effectively connected to oscillator 63 by the output of microprocessor 59, oscillator 63 will operate at another frequency. The output of oscillator 63 passes through a load protection circuit composed of resistor 79 and capacitors 78 and 77 which protects transformer 76. This transformer isolates the tip and ring lines from the SCU and enables the SCU to be referenced to the KSU ground, and the tip and ring lines to be referenced to the MCU ground. The above described circuit permits high frequency signals on the tip and ring wires of the CO line to be exchanged, and at the same time permits current to be supplied by the SCU through the tip wire.

High frequency signals transmitted from microprocessor 21 to an SCU pass through tone decoder 64 (such as National Semiconductor 567 phase-locked loop) after amplification by operational-amplifier 66, which utilize resistors 80, 81.

The oscillator circuit of an SCU is used to transmit high frequency signals from the SCU toward the MCU along the tip and ring wires 88 and 67, respectively, of the CO control line wires. When a user picks up the telephone handset making the station off-hook, and presses a line selection key, the push button selection circuit detects the "A"-to-ground signal, and transmits the information about the selected line to microprocessor 59. The microprocessor switches on oscillator 63, and modulates the oscillation between two frequencies, say between 100 KHZ and 80 KHZ. The transmission of the oscillation is thus modulated into two states "1" (100 KHZ) and "0" (80 KHZ). The specific set of "0" and "1" bits, is determined by jumpers 62 by for each SCU.

As shown in FIG. 3, the modulated oscillation is presented on line 53 and from there transferred through comparator 56 into I/O expander 24a and through I/O line 27 to microprocessor 21 where decoding occurs. The particular set of modulated frequency bits as determined by preselection of jumpers 62 will identify to the microprocessor the station going off-hook and the CO line selected. With the five jumpers that are used, 32 different modulated frequency bits-combinations can be used, allowing unique identification of 32 stations. Information on the CO line selected is transmitted in another 3 bit combination.

This arrangement results in automatically addressing the MCU by a station going off-hook using a unique address code which the MCU decodes to identify the originating station. This information is useful in many situations in which the MCU has to respond to a request specific of a particular station, e.g., a request to get a call back from the MCU when a redialed number is answered. In this case, after the request has been issued from a station, the MCU itself dials the requested number on a CO line. When the MCU detects a connection (answer), a similar pattern of modulated oscillations is sent back on the same communication link, but this time, the coded signals that identify the requesting station are sent *from* the tip and ring wires *toward* the SCU. Such coded signals are amplified on amplifier 66 and decoded by the requesting station by decoder 64. All of the other SCU's receive the coded signals, but only the requesting station will identify such signals.

The MCU is programmed via microprocessor 59 to send back various sequences of high frequency "1" and "0" bits; and each SCU is programmed to respond to one and only one sequence. Piezoceramic buzzer 68 in the SCU is activated when the SCU decodes its own address alerting the user of a call initiated by the MCU. The advantage of this high speed, high frequency, duplex communication between the MCU and the SCU is that it can be carried on the CO "control line", even in the presence of ongoing conversation on the same line without any interferences from or to the audio signals.

Those skilled in the telephone art can appreciate that the digital communication between the SCU and the MCU can be used for other types of messages, for information transmission, and for activating visual indicators on the SCU side Furthermore, the flexibility of using software on both microprocessors 21 and 59 permits other functions related to communication management of an electromechanical key system to be carried out utilizing the structure and principles of the enhancement devices described in this invention.

Figure 6:
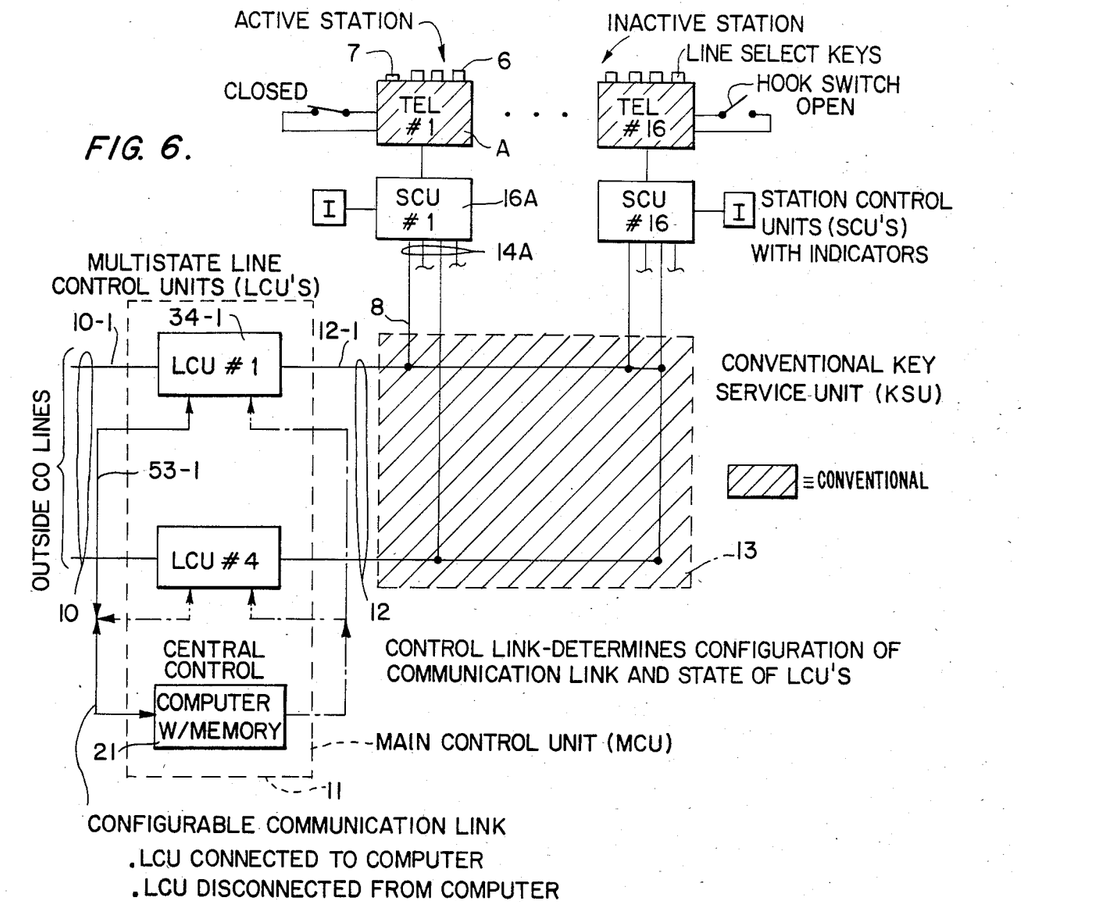
FIG. 6 is a schematic block diagram of apparatus according to the present invention as incorporated into a conventional telephone system that utilizes a key service unit for connecting a plurality of key stations to a plurality of outside central office lines.
Figure 7:
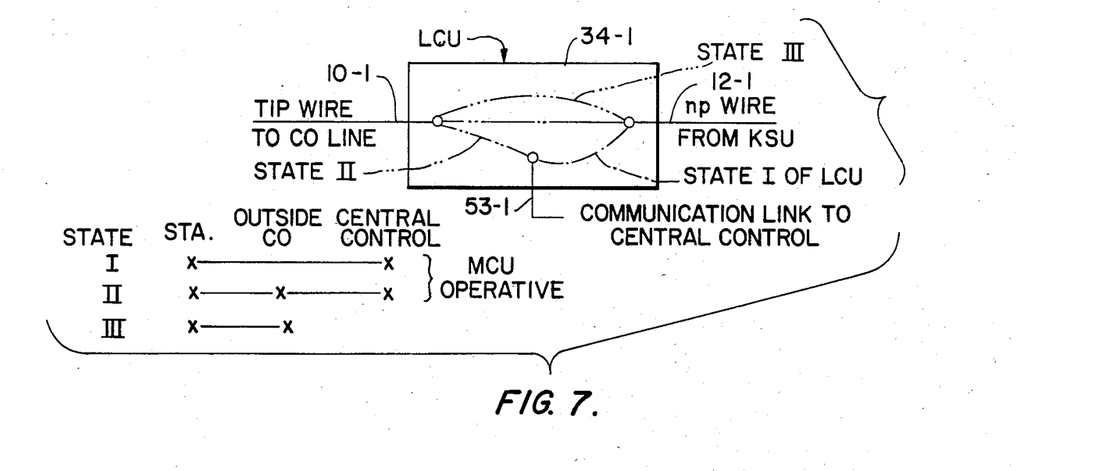
FIG. 7 is a schematic diagram of a line control unit according to the present invention showing the various states that this device can have.

Important aspects of the invention are summarized in FIGS. 6 and 7 to which reference is now made. As indicated in FIG. 6, station A is active because its hook switch has been closed, and because key 7 of line-select keys 6 has been actuated (depressed). Assuming that key 7 is operatively associated with outside CO line 10-1 of CO lines 10, actuation of key 7 will cause KSU 13 to connect tip wire 8 in cable 14A, which is coupled to SCU 16A operatively associated with station A, to tip wire 12-1 of inside CO lines 12. Assuming MCU 11 is operative, only fault relay 42 of the three relays 35, 41 and 42 (FIG. 3) will be energized, and contacts 42b will be closed. Consequently, LCU 34-1, interposed between lines 12-1 and 10-1, will have a state (termed state I) in which tip wire 12-1 is connected to communication link 53-1 which is connected to microprocessor 21 via I/O expander 24a (FIG. 3). Tip-wire 12-1, however, is not connected to tip-wire 10-1 of the outside CO lines because contacts 41a associated with relay 41 are open. For reference purposes, the connections effected by the various states of LCU 34-1 are shown in FIG. 7.

In state I, LCU 34-1 establishes a communication link that effects addressing of SCU 16A (and any other SCU associated with a station that is active and which has selected line 10-1) by the central control which includes microprocessor 21, and addressing of the central control by SCU 16A. As described previously, addressing information is transmitted between the central control and the various SCU's using modulated signals whose frequencies are above the audible range. As a consequence, voice information transferred via wire 12-1 between two active stations operating in an intercom mode can take place simultaneously with addressing information flowing in line 12-1 between the central control and a third SCU that becomes active.

The address sent by SCU 16A identifies station A as being active. DTMF signals generated by the user at station A are transferred via link 53-1 only into the central control because LCU 34-1 is still in state I. Such signals are analyzed by the central control, and appropriate responses programmed into the memory of the central control are issued. For example, audio information may be sent to the active station from speech ROM 48 or from tape circuit 49. On the other hand, if the central control verifies that the DTMF signals from station A authorize the station, or the user, to gain direct access to an outside line, the central control may issue a command through I/O expander 24b to change the state of LCU 34-1 by maintaining the energization of relay 42 and energizing relay 41 which closes contacts 41a coupling station A to outside line 10-1 through audio transformer 43. When this occurs, LCU 34-1 through audio transformer 43. When this occurs, LCU 34-1 will be in state II (see FIG. 7) wherein link 53-1 will be connected directly to line 12-1 to effect the transfer of high frequency addressing information, and indirectly to line 10-1 through audio transformer 43 for effecting the transfer of audio information from the central control to both station A and to the outside line.

Alternatively, if the DTMF signals from station A warrant, the central control can effect outside dialing before the central control changes LCU 34-1 from state I to state II (i.e., before relay 41 is energized) by the addition of further logic relays and/or audio transformers. However, it is presently preferred to change LCU 34-1 from its state I to its state II before the central control effects outside dialing. Once relay 41 is energized, DTMF signals as well as other audio information can be transmitted from the central control to line 10-1 via switch array 46 and line 53-1 which connects to one side of audio transformer 43.

In the event of a power failure, relay 42 will be denergized and contacts 42b and 42c will be closed; relay 41 will also be deenergized and contacts 41a will be closed. Under this condition, LCU 34-1 will be in state III; and station A will be connected via line 12-1 to line 10-1 through the audio transformer 43.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

We claim:

1. Apparatus for enhancing an electromechanical key telephone system having a plurality of stations connected to a plurality of central office (CO) lines through a key service unit (KSU), comprising: a main control unit (MCU), means establishing a direct communication link between said MCU and each telephone station for effecting its addressing by said MCU which is constructed and arranged to intercept incoming calls on the CO lines before such calls reach the KSU for exercising detection and control of said incoming calls, and a station control unit (SCU) operatively associated with each station and positioned between the telephone station and the KSU, the SCU's being constructed and arranged to address said MCU and to be addressed by said MCU.

2. Apparatus according to claim 1 in which the main control unit includes a microcomputer for controlling one or more of said incoming central office lines utilizing relays operated by the microcomputer.

3. Apparatus according to claim 2 wherein said microcomputer has means for detecting the hook state of each telephone station, means for detecting ring signals coming in on each CO line, and means for selectively putting each CO line on hold.

4. Apparatus according to claim 3 wherein said MCU includes means responsive to inside dual tone multiple frequency (DTMF) signals emanating from a telephone station in the system for intercepting said signals before they are applied to the CO line selected by the station.

5. Apparatus according to claim 3 wherein said MCU includes means responsive to outside dual tone multiple frequency (DTMF) signals emanating from a station outside the system on a CO line connected to said KSU, for intercepting said signals before they are applied to a station in the system.

6. Apparatus according to claim 4 wherein said MCU includes speech synthesizer and speech ROM means for sending verbal messages in response to said inside DTMF signals, or independently of them, on all of the CO lines controlled by said MCU to the internal telephone stations of the system.

7. Apparatus according to claim 4 wherein said MCU includes speech synthesizer and speech ROM means for sending verbal messages in response to said outside DTMF signals on a CO line controlled by said MCU to a telephone station external to the system connected to the last mentioned CO line.

8. Apparatus according to claim 1 wherein said MCU has means for generating high frequency, code-modulated signals on the CO lines toward the SCU's for addressing a selected SCU.

9. Apparatus according to claim 8 wherein the SCU's have indicator means operable to generate an indicator signal, and said selected SCU is responsive to being addressed by said MCU for operating said indicator means to alert a user at the station addressed by the MCU.

10. Apparatus according to claim 9 where an SCU generates ultrasonic, modulated signals on the tip wire through the KSU toward the MCU when a station with which the SCU is associated becomes active by going off-hook and by selecting a CO line for identifying to the MCU which station is active.

11. Apparatus according to claim 1 wherein said MCU is constructed and arranged to manage and control functions within the telephone system, such functions including intercommunication between stations, call reminders, automatic redialing, speed dialing, lowest cost routing of telephone calls, queueing of incoming calls and automatic speech messages to outside callers or telephones.

12. Apparatus according to claim 11 including a printing unit for printing telephonic data intercepted by said apparatus, and a cassette deck containing voice information that is played back under the control of the MCU from any or all CO lines incoming to the key system.

13. Apparatus for use with a telephone system having a plurality of stations each of which becomes active when the station goes off-hook and one of a plurality of keys at the station is actuated for selecting one of a plurality of outside central office (CO) lines connected to the stations through a key service unit (KSU), said apparatus comprising:
(a) a station control unit (SCU) associated with each station for connecting the same to the KSU;
(b) a main control unit (MCU) for connection between the KSU and the outside CO lines, said MCU having a computer-based central control, and a multistate line control unit (LCU) operatively associated with each outside CO line for connecting each station in parallel to the selected CO line and/or to the central control in accordance with the state of the LCU operatively associated with the selected CO line; and
(c) means for effecting addressing between the MCU and the SCU's and for controlling the state of the LCU's as a consequence of such addressing when the MCU is operative such that the MCU manages connections of the system to the CO lines and signalling between the stations according to a predetermined plan contained in the control unit.

14. Apparatus according to claim 13 wherein:
(a) each SCU is responsive to an off-hook condition and to actuation of a key at a station that becomes active for generating a unique address signal that identifies the active station;
(b) each LCU establishing a communication link between the stations of the system and the central control when the MCU is operative for effecting transmission of signals between the SCU's and the central control; and
(c) said central control has means responsive to an address signal from the SCU associated with an active station for identifying the same.

15. Apparatus according to claim 14 wherein each LCU has a first state such that an off-hook station is disconnected from the CO line with which the LCU is associated whereby an active station is denied connection to to the last mentioned CO line.

16. Apparatus according to claim 15 wherein the central control has audio information stored therein which is selectively applied to the communication link for transmission to active stations.

17. Apparatus according to claim 14 wherein address signals generated by the SCU's are in the ultrasonic frequency range.

18. Apparatus according to claim 17 wherein the MCU has address generating means for generating address signals that address individual ones of the SCU's.

19. Apparatus according to claim 15 wherein the central control has means responsive to dialing information from an active station that has selected a given CO line for generating an address signal of another station in the system, the so-generatd address signal being transmitted via the communication link of the LCU associated with the given CO line to all of the stations in the system.

20. Apparatus according to claim 19 wherein the address signals generated by the central control are in the ultrasonic frequency range.

21. Apparatus according to claim 18 wherein each SCU has an indicator associated therewith for generating an indicator signal when the indicator is actuated, each SCU having means responsive to address signals in the communication links associated with the LCU's for actuating the indicator associated therewith only when the SCU is addressed by its unique address signal whereby the station is alerted to a call from another station.

22. Apparatus according to claim 15 wherein each LCU has a second state such that an off-hook station is connected to the outside CO line with which the LCU is associated, and the central control has means for selectively changing the state of the LCU's.

23. Apparatus according to claim 22 wherein the central control has means responsive to dialing information generated by an active station that has selected a given CO line for controlling access by the active station to any of the CO lines.

24. Apparatus according to claim 23 wherein the central control has means responsive to dialing information generated by an active station for connecting the active station to a CO line.

25. Apparatus according to claim 23 wherein the central control has means responsive to dialing information generated by an active station for generating dialing information and transmitting it into the selected outside CO line.

26. Apparatus according to claim 23 wherein the central control changes the state of the LCU associated with said given CO line from its first to its second state after the outside dialing is complete.

27. Apparatus according to claim 26 wherein the central control has means for monitoring the response to the outside dialing.

28. Apparatus according to claim 27 wherein the central control has means for addressing the SCU associated with the station that generated the dialing information in accordance with said response.

29. Apparatus according to claim 27 wherein the central control contains a repetoire of audio signals and transmits one or more signals from said repetoire into said given outside CO line.

30. Apparatus according to claim 29 wherein signals are selected from said repetoire in accordance with said response.

31. Apparatus according to claim 25 wherein said central control has means for detecting ring signals on each CO line and placing each CO line on hold.

32. Apparatus according to claim 25 wherein the central control has means for storing data identifying incoming and outgoing calls.

33. Apparatus according to claim 32 wherein the central control has means for printing stored data.

34. Apparatus according to claim 15 wherein each LCU has third state such that an active station is connected to the selected outside CO line with which the LCU is associated, and the central control has means responsive to a power failure for switching the LCU to its third state.

35. A line control unit (LCU) for connecting the tip and ring wires of an outside central office (CO) line to the inside tip and ring wires at the CO side of a key service unit (KSU) of an electrical mechanical key telehone system, said LCU comprising:
 (a) a ring detector circuit connected across the outside tip and ring wires for detecting an incoming call thereon;
 (b) a selectively adjustable signal path for connecting the outside tip and ring wires to the inside tip and ring wires;
 (c) a selectively operable internal-external switch in said signal path; and
 (d) means for selectively opening and closing said internal-external switch independently of detection of an incoming call by said ring detector circuit.

36. An LCU according to claim 35 wherein said internal-external switch is constituted by the contacts of a relay.

37. An LCU according to claim 35 wherein the signal path includes an audiotransformer one side of which is connected across the inside tip and ring wires, and the other side of which is connected across the outside tip and ring wires.

38. An LCU according to claim 37 wherein said internalexternal switch is serially connected to said other side of said audiotransformer.

39. An LCU according to claim 38 including a fault switch serially connected to said one side of said audiotransformer.

40. An LCU according to claim 39 whrein said fault switch is normally closed and said internal-external switch is normally open.

41. An LCU according to claim 40 including a signal path between said fault switch and the outside tip wire when said fault switch is open.

42. A main control unit (MCU) for connecting the tip and ring wires of an outside central office (CO) line to the inside tip and ring wires at the CO side of a key service unit (KSU) of an electromechanical key telephone system, comprising:
 (a) a line control unit (LCU) having first and second states that respectively disconnects and connects the inside tip and ring wires to the outside tip and ring wires;
 (b) a hook detector circuit responsive to an offhook state of a telephone set connected to the tip and ring wires of the KSU for producing an off-hook detect signal;
 (c) means responsive to an off-hook detect signal produced by the hook detect circuit for maintaining the LCU in its first state until a predetermined condition is met and then switching the LCU to its second state.

43. An MCU according to claim 42 including means responsive to a dialing sequence produced by said telephone for changing the LCU to its second state.

44. An MCU according to claim 43 including a ring detect circuit for detecting outside calls on the CO line, and a hold circuit for capturing the CO line in response to detection of an outside call.

45. Apparatus for use with a telephone system having a plurality of outside central office (CO) lines comprising:
 (a) a main control unit (MCU) that includes a line control unit (LCU) associated with each outside CO line for interconnecting the same to a respective one of a plurality of inside CO lines, the state of an LCU establishing the nature of the connection between the asociated outside CO line and the inside CO line interconnected thereto;
 (b) a plurality of telephone stations each having a plurality of individually actuatable line selector keys respectively associated with said plurality of inside CO lines;
 (c) a key service unit (KSU) connected to said inside CO lines and having a cable associated with each telephone station, each cable having a conductor connected to one of the inside CO lines whereby each inside CO line is physically present in the cable;
 (d) a station control unit (SCU) associated with each telephone station for connecting the latter to different ones of said cables, each SCU being constructed an arranged to generate an address signal in response to actuation of one of the selector keys of the telephone station with which the SCU is associated; and
 (e) said MCU being constructed and arranged to receive address signals from the SCU's which are transmitted via the conductors in said cables.

46. Apparatus according to claim 45 wherein said MCU is responsive to a received address signal for establishing the state of one or more of the LCU's.

47. Apparatus according to claim 46 wherein each LCU has a state in which a telephone station is connected to one of said outside CO lines, and a different state in which the station is disconnected from any outside CO line.

48. Apparatus according to claim 47 wherein said MCU is constructed and arranged to transmit address signals to said SCU's, and each SCU has an indicator that is operated in response to its addressing by said MCU.

* * * * *